United States Patent
Blea et al.

(10) Patent No.: US 10,241,698 B2
(45) Date of Patent: Mar. 26, 2019

(54) PRESERVATION OF A GOLDEN COPY THAT STORES CONSISTENT DATA DURING A RECOVERY PROCESS IN AN ASYNCHRONOUS COPY ENVIRONMENT

(71) Applicant: INTERNATIONAL BUSINESS MACHINES CORPORATION, Armonk, NY (US)

(72) Inventors: David R. Blea, Round Rock, TX (US); Anthony J. Ciaravella, Tucson, AZ (US); Gregory E. McBride, Vail, AZ (US); Pamela A. Schull, Tucson, AZ (US); Damian Trujillo, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 15/469,218

(22) Filed: Mar. 24, 2017

(65) Prior Publication Data
US 2018/0275897 A1    Sep. 27, 2018

(51) Int. Cl.
G06F 11/14    (2006.01)
G06F 11/20    (2006.01)
G06F 3/06    (2006.01)

(52) U.S. Cl.
CPC ............ G06F 3/0619 (2013.01); G06F 3/065 (2013.01); G06F 3/067 (2013.01); G06F 3/0665 (2013.01); G06F 11/1451 (2013.01); G06F 11/1464 (2013.01); G06F 11/2074 (2013.01); G06F 2201/84 (2013.01)

(58) Field of Classification Search
CPC ........................................ G06F 11/20–11/2097
See application file for complete search history.

(56) References Cited

U.S. PATENT DOCUMENTS

| | | | | |
|---|---|---|---|---|
| 7,464,126 B2* | 12/2008 | Chen | .................... | G06F 11/2064 707/655 |
| 9,389,892 B2 | 7/2016 | Ben Or et al. | | |
| 2006/0136685 A1* | 6/2006 | Griv | .................... | G06F 11/2064 711/162 |
| 2007/0245105 A1* | 10/2007 | Suzuki | ................ | G06F 11/1451 711/162 |
| 2008/0320219 A1* | 12/2008 | Okada | ................. | G06F 11/2074 711/114 |

(Continued)

FOREIGN PATENT DOCUMENTS

WO        9912098        3/1999

OTHER PUBLICATIONS

L. Gundy, "Continuing the understanding of IBM Copy Service", Mar. 2014, pp. 32.

(Continued)

*Primary Examiner* — Nathan Sadler
(74) *Attorney, Agent, or Firm* — Rabindranath Dutta; Konrad Raynes Davda & Victor LLP (57) ABSTRACT

A secondary volume of a remote computational device stores an asynchronous copy of a primary volume of a local computational device. The remote computational device generates a golden copy that stores consistent data. At least one previous version of the golden copy is stored in a journal volume of the remote computational device.

15 Claims, 9 Drawing Sheets

(56) References Cited

U.S. PATENT DOCUMENTS

| | | | | |
|---|---|---|---|---|
| 2011/0138048 A1* | 6/2011 | Dawson | ................ | G06F 9/4856 |
| | | | | 709/226 |
| 2014/0351534 A1* | 11/2014 | Crawford | ................ | G06F 3/065 |
| | | | | 711/162 |
| 2015/0286424 A1* | 10/2015 | Dain | .................... | G06F 3/0619 |
| | | | | 711/103 |
| 2016/0364170 A1* | 12/2016 | Nasu | ........................ | G06F 3/06 |

OTHER PUBLICATIONS

"IBM IMS and DB2 Recovery Workshop", IBM Corporation, 2013, pp. 21.

D. Clitherow, et al., "IBM GDPS Family an Introduction to Concepts and Capabilities", IBM Corporation, IBM Redbooks document No. SG24-6374-11, Jul. 2016, pp. 406.

* cited by examiner

PRESERVATION OF A GOLDEN COPY THAT STORES CONSISTENT DATA DURING A RECOVERY PROCESS IN AN ASYNCHRONOUS COPY ENVIRONMENT

BACKGROUND

1. Field

Embodiments relate to the preservation of a golden copy that stores consistent data during a recovery process in an asynchronous copy environment.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data on one storage device may be copied to the same or another storage device so that access to data volumes may be provided from two different locations. The copying of a data set from a source volume to a target volume may be performed synchronously or asynchronously. In synchronous copy unless an acknowledgement is received that the data set has been written to the target volume, the host waits for the synchronous copy operation initiated by the host to complete, whereas in asynchronous copy the host does not have to wait for the asynchronous copy operation initiated by the host to complete.

Point in time copy allows creation of instantaneous, point in time snapshot copies of entire logical volumes or data sets. A point in time copy may involve physically copying all the data from source volumes to target volumes so that the target volume has a copy of the data as of a point in time. A point in time copy can also be made by logically making a copy of the data and then only copying data over when necessary.

When an application has one write that is dependent on the completion of another write, the application is said to have dependent writes. Using dependent writes, applications may manage the consistency of their data, so that a consistent state of the application data on storage devices is maintained, in the event of a failure in the host or the storage controller.

To maintain the consistency of data across multiple storage volumes at a remote backup location, certain storage controllers support the concept of a consistency group. Storage volumes in a copy relationship that are configured into a consistency group are maintained to ensure that a group of dependent updates made to the storage volumes at the primary location are made together as a unit on the storage volumes at the remote backup location to maintain data consistency.

Asynchronous remote copy is a mechanism that provides data replication over extended distances between two sites for business continuity, disaster recovery, and for other reasons. Asynchronous remote copy replicates the data asynchronously from a local site (e.g., a primary location) to a remote site.

FlashCopy* (FLC) is a type of point in time copy in which nearly instantaneous point in time snapshot copies of entire logical volumes or data sets may be created, and Global Mirror* (GM) provides data replication over extended distances via asynchronous copying with recovery point objectives (RPO) of as low as 3-5 seconds or less. Further details of Global Mirror may be found in the publication "IBM GDPS Family: An Introduction to Concepts and Capabilities", published July 2016, by International Business Machines Corporation.

*FlashCopy and Global Mirror are trademarks or registered trademarks of International Business Machines Corporation registered in many jurisdictions worldwide.

SUMMARY OF THE PREFERRED EMBODIMENTS

Provided are a method, system, and computer program product in which a secondary volume of a remote computational device stores an asynchronous copy of a primary volume of a local computational device. The remote computational device generates a golden copy that stores consistent data. At least one previous version of the golden copy is stored in a journal volume of the remote computational device.

In further embodiments, a determination is made as to whether cascaded point in time copy operations are supported in the remote computational device.

In yet further embodiments, in response to determining that cascaded point in time copy operations are not supported in the remote computational device, a new version of the golden copy is generated, subsequent to the storing of the at least one previous version of the golden copy in the journal volume.

In additional embodiments, in response to determining that cascaded point in time copy operations are supported in the remote computational device, the secondary volume, the golden copy, and the journal volume are configured in a point in time cascade.

In yet additional embodiments, in response to configuring the secondary volume, the golden copy, and the journal volume in a point in time cascade, the remote computational device generates new versions of the golden copy while storing previous versions of the golden copy in the journal volume.

In certain embodiments, the journal volume stores identification of tracks that are not in synchronization and data updates.

In further embodiments, the journal volume is used to recover a last consistency group to the secondary volume during an asynchronous copy recovery process.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In an asynchronous copy environment (e.g., a Global Mirror environment) a primary volume at a local site may be asynchronously copied to a secondary volume at a remote site. A point in time copy that uses the secondary volume as a point in time source volume is performed at an opportune time to generate a point in time target volume, where the point in time target volume may be referred to as a golden copy. The golden copy stores consistent data that may be used to make the secondary volume consistent if recovery is required. Therefore if there is a need for recovery then the golden copy provides the consistent data for recovery.

The golden copy may be created before restarting an asynchronous copy process. The reason is that during an incremental resynchronization the secondary volume may be inconsistent. In case there is a disaster while the resynchronization is running, a customer is still be able to recover consistent data from the golden copy.

In certain asynchronous copy environments recovery processes may overwrite all or some of the data in the golden copy. In such situations, customers may not want the latest recovery as the latest recovery may contain corrupted data. Customers may prefer to keep a golden copy of the last known point in time copy that was tested to be correct. Certain embodiments create a copy of the golden copy in case the customer prefers to recover from an older data point. This copy of the golden copy is then used for quickly restoring data from the older data point.

Exemplary Embodiments

Figure 1:
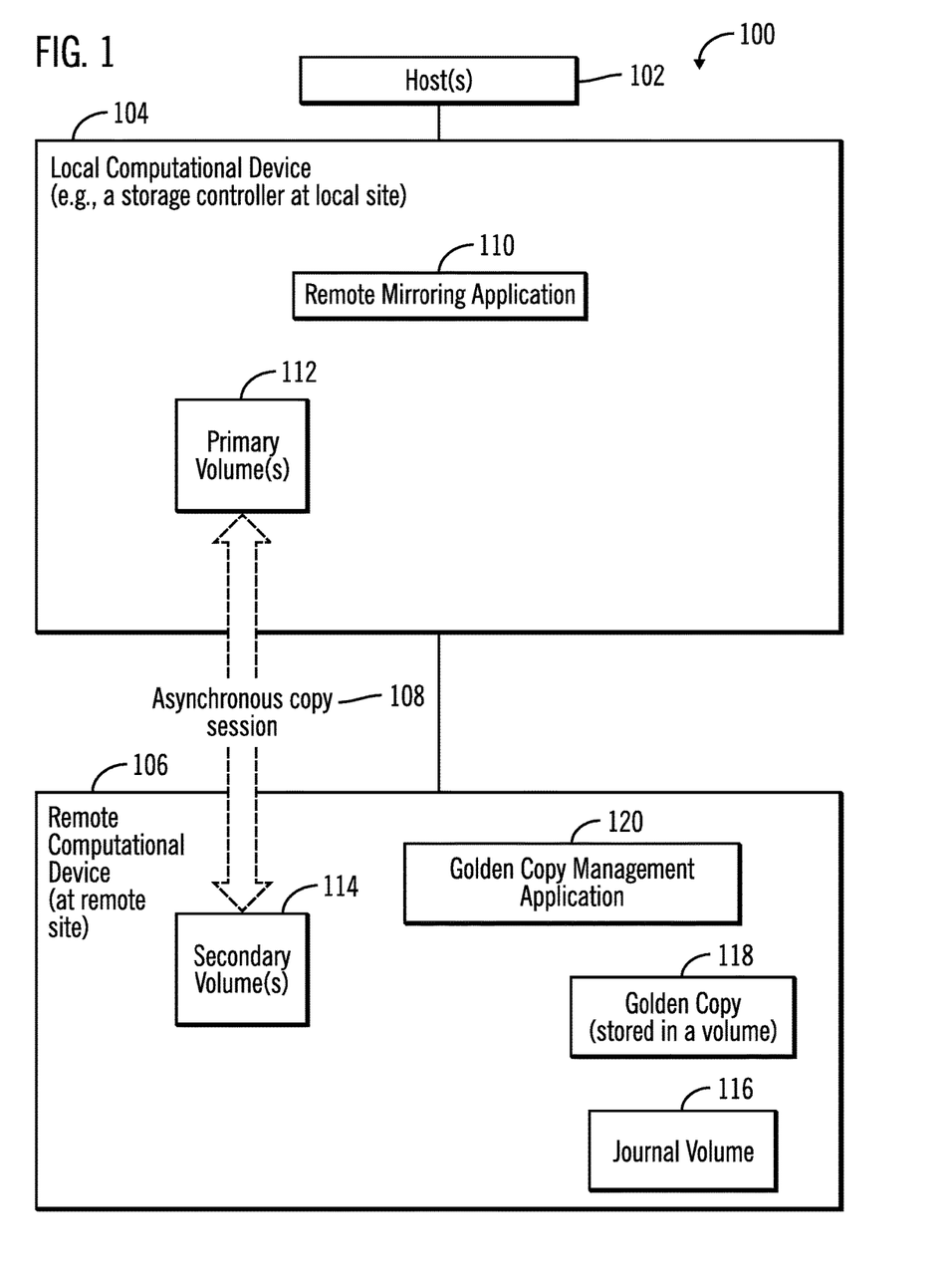
FIG. 1 illustrates a block diagram of a computing environment comprising one or more hosts, a local computational device at a local site, and a remote computational device at a remote site, in accordance with certain embodiments.

FIG. 1 illustrates a block diagram of a computing environment 100 comprising one or more hosts 102, a local computational device 104 at a local site, and a remote computational device 106 at a remote site, where an asynchronous copy session 108 initiated by a remote mirroring application 110 may be used to asynchronously copy one or more primary volumes 112 controlled by the local computational device 104 to one or more secondary volumes 114 controlled by the remote computational device 106, in accordance with certain embodiments.

The host 102, the local computational device 104, and the remote computational device 106 may comprise any suitable computational device including those presently known in the art, such as, a personal computer, a workstation, a server, a mainframe, a hand held computer, a palm top computer, a telephony device, a network appliance, a blade computer, a processing device, etc. The host 102, the local computational device 104 and the remote computational device 106 may be elements in any suitable network, such as, a storage area network, a wide area network, the Internet, an intranet, etc. In certain embodiments. In certain embodiments, the host 102, the local computational device 104 and the remote computational device 106 may be elements in a cloud computing environment. The local computational device 104 may be separated from the remote computational device 106 by an extended distance (e.g., over 5 kilometers). The host 102, the local computational device 104, and the remote computational device 106 may each be comprised of one or more computational devices.

In certain embodiments, the local computational device 104 may comprise a storage controller at the local site, where the local computational device 104 may control storage devices and allow one or more of the hosts 102 to perform input/output (I/O) operations on logical storage volumes maintained by the local computational device 104, and where the local computational device 102 also maintains physical storage volumes corresponding to logical storage volumes in the storage devices controlled by the local computational device 104.

The logical storage volumes maintained by the local computational device 104 at the local site may be referred to as primary volumes 112, and logical storage volumes maintained by the remote computational device 106 are referred to as secondary volumes 114. The remote mirroring application 110 that executes in the local computational device 104 may initiate the asynchronous copy session 108. The asynchronous copy session 108 asynchronously starts copying (i.e., replicating) the primary volumes 112 to the remote computational device 106, where the remote computational device 106 maintains the asynchronous copes in logical storage volumes, referred to as secondary volumes 114.

In certain embodiments, write operations that occur to primary volumes 112 while the asynchronous copy session 108 is in progress may cause a lack of synchronization between the primary volumes 112 and the secondary volumes 114. A journal volume 116 is maintained in the remote computational device 106. The journal volume 116 stores the last consistent set of data while the replication occurs between the primary volumes 112 and the secondary volumes 114, where the primary volumes 112 store out of synchronization bitmaps that indicate which tracks have yet to be synchronized between the primary volumes 112 and secondary volumes 114. At an opportune time, a golden copy 118 that stores consistent data is generated and stored in a volume by performing a point in time copy of the secondary volumes 114.

In certain embodiments, during a recovery process, a copy of the golden copy 118 is made to the journal volume 116 by a golden copy management application 120 that executes in the remote computational device 106. When the golden copy 118 is overwritten, at least one previous golden copy is still maintained in the journal volume 116 and this previous golden copy may be used to restore the primary volumes 112 and/or secondary volumes 114 to an older (i.e., an earlier) data point.

Therefore, FIG. 1 illustrates certain embodiments in which one or more previous versions of the golden copy 118 are stored in the journal volume 116 for restoration of storage volumes to an earlier data point.

Figure 2:
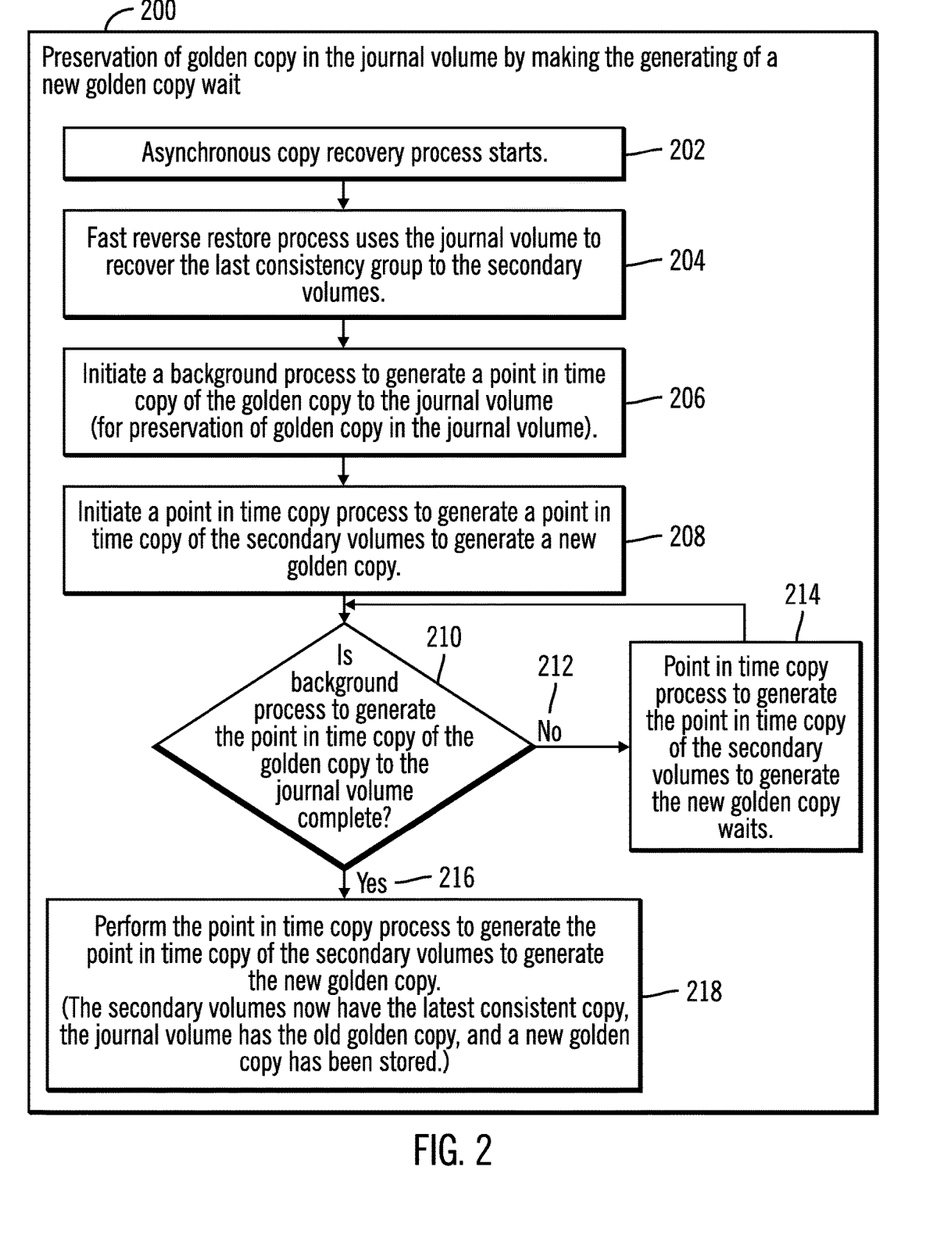
FIG. 2 illustrates a flowchart that shows the preservation of a golden copy in a journal volume by making the generation of a new golden copy wait, in accordance with certain embodiments.

FIG. 2 illustrates a flowchart 200 that shows the preservation of a golden copy in a journal volume 116 by making the generation of a new golden copy wait, in accordance with certain embodiments. The operations shown in FIG. 2 may be performed by applications (e.g., the golden copy management application 120) and processes that execute in the remote computational device 106.

Control starts at block 202 in which an asynchronous copy recovery process starts in response to a failure or loss of data in the primary volumes 112 or secondary volumes 114. Control proceeds to block 204 in which a fast reverse restore process uses the journal volume 116 to recover the last consistency group to the secondary volumes 114. The golden copy management application 120 initiates (at block 206) a background process to generate a point in time copy of the golden copy 118 to the journal volume 116, for preservation of golden copy 118 in the journal volume 116.

Control proceeds to block 208 in which the golden copy management application 120 initiates a point in time copy process to generate a point in time copy of the secondary volumes 114 to generate a new golden copy. The golden copy management application 120 determines (at block 210) if the background process to generate the point in time copy of the golden copy to the journal volume has completed. If not ("No" branch 212) control proceeds to block 214 in which the point in time copy process to generate the point in time copy of the secondary volumes 114 to generate the new golden copy waits and control returns to block 210.

If at block 210, the golden copy management application 120 determines that the background process to generate the point in time copy of the golden copy to the journal volume has completed ("Yes" branch 216) then control proceeds to block 218 in which the golden copy management application 120 performs the point in time copy process to generate the point in time copy of the secondary volumes 114 to generate the new golden copy. The secondary volumes 114 now have the latest consistent copy, the journal volume 116 has the old golden copy, and a new golden copy has been stored.

Therefore, FIG. 2 shows certain embodiments in which the point in time copy process to generate the point in time copy of the secondary volumes 114 to generate the new golden copy has to wait while the background process to generate the point in time copy of the golden copy to the journal volume is in progress.

Figure 3:
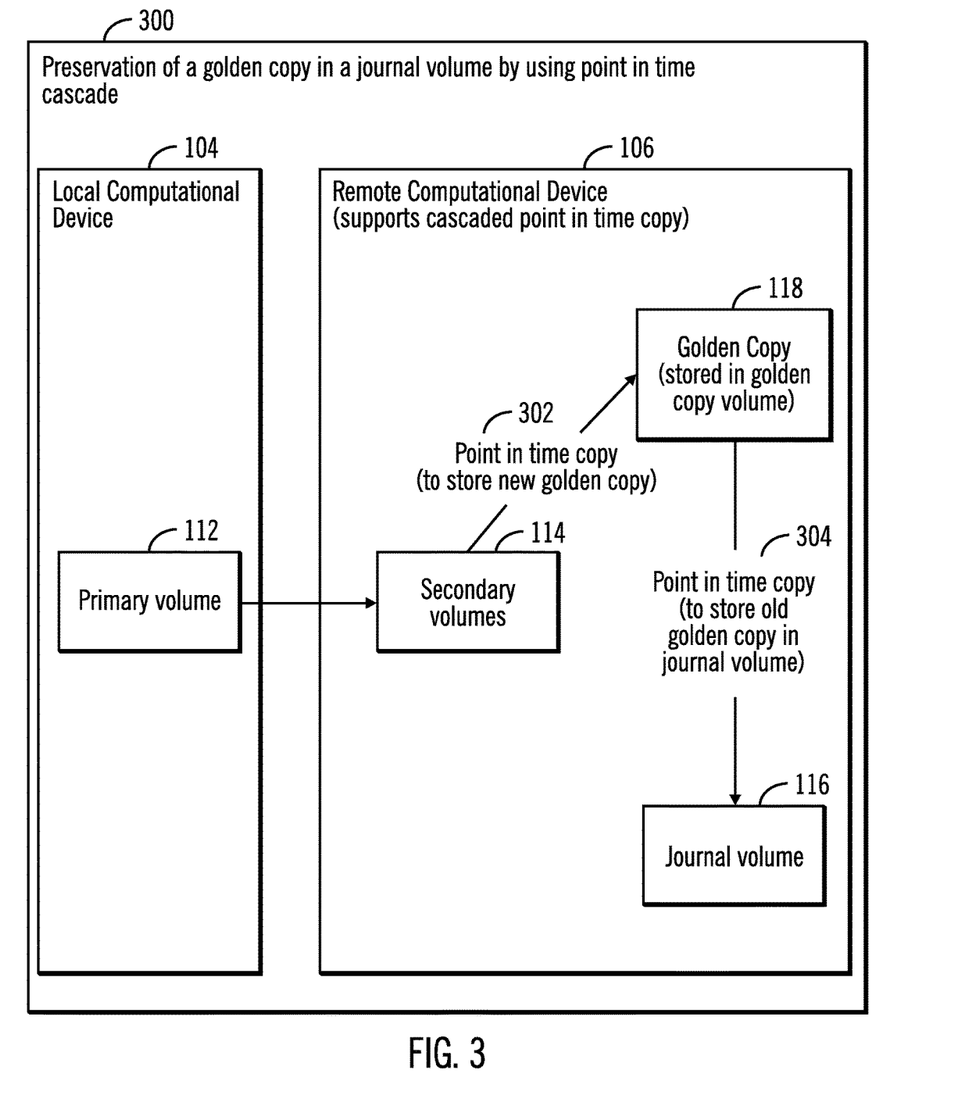
FIG. 3 illustrates a block diagram that shows the preservation of a golden copy in a journal volume by using a point in time cascade, in accordance with certain embodiments.

FIG. 3 illustrates a block diagram 300 that shows the preservation of a golden copy in a journal volume 116 by using a point in time cascade, in accordance with certain embodiments. In a point in time cascade, the point in time copy of the secondary volumes 114 to generate a new golden copy (block 302) is performed at the same time in which the point in time copy to store the old golden copy to the journal volume 116 is performed (block 304). The remote computational device 106 has to support cascaded point in time copy for the golden copy management application 120 to initiate the cascaded point in time copy.

Figure 4:
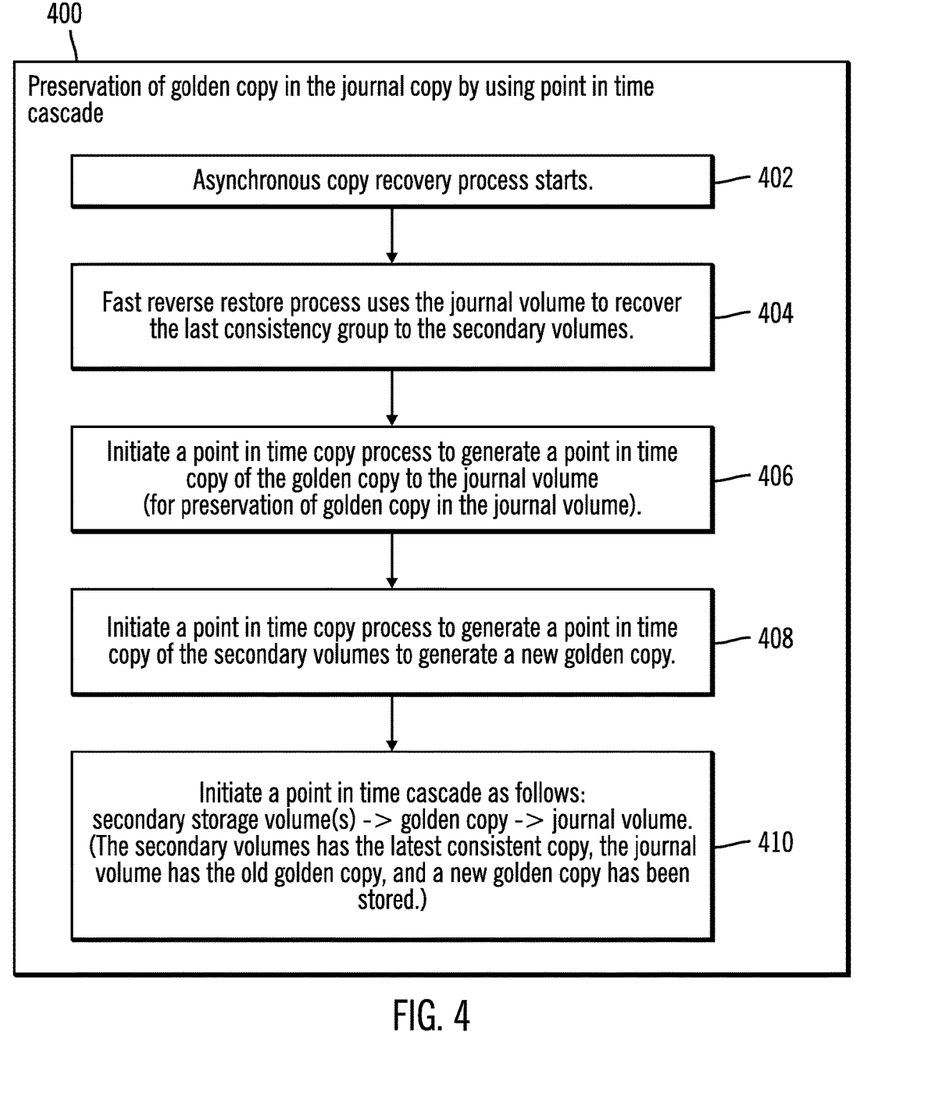
FIG. 4 illustrates a flowchart that shows the preservation of a golden copy in a journal volume by using a point in time cascade, in accordance with certain embodiments.

FIG. 4 illustrates a flowchart 400 that shows the preservation of a golden copy in a journal volume by using a point in time cascade, in accordance with certain embodiments. The operations shown in FIG. 4 may be performed by applications (e.g., the golden copy management application 120) and processes that execute in the remote computational device 106.

Control starts at block 402 in which an asynchronous copy recovery process starts in response to a failure or loss of data in the primary volumes 112 or secondary volumes 114. Control proceeds to block 404 in which a fast reverse restore process uses the journal volume 116 to recover the last consistency group to the secondary volumes 114. The golden copy management application 120 initiates (at block 406) a point in time copy process to generate a point in time copy of the golden copy 118 to the journal volume 116, for preservation of golden copy 118 in the journal volume 116.

Control proceeds to block 408 in which the golden copy management application 120 initiates a point in time copy process to generate a point in time copy of the secondary volumes 114 to generate a new golden copy. The golden copy management application 120 initiates (at block 410) a point in time cascade (shown in FIG. 4 as secondary storage volume(s)→golden copy→journal volume) to generate the point in time copy of the golden copy to the journal volume 116 while at the same time generating a new golden copy from the secondary volumes 114.

Therefore, FIG. 4 shows certain embodiments in which by using a point in time cascade, the point in time copy process to generate the point in time copy of the secondary volumes 114 to generate the new golden copy does not have to wait while the generation of the point in time copy of the golden copy to the journal volume is in progress.

Figure 5:
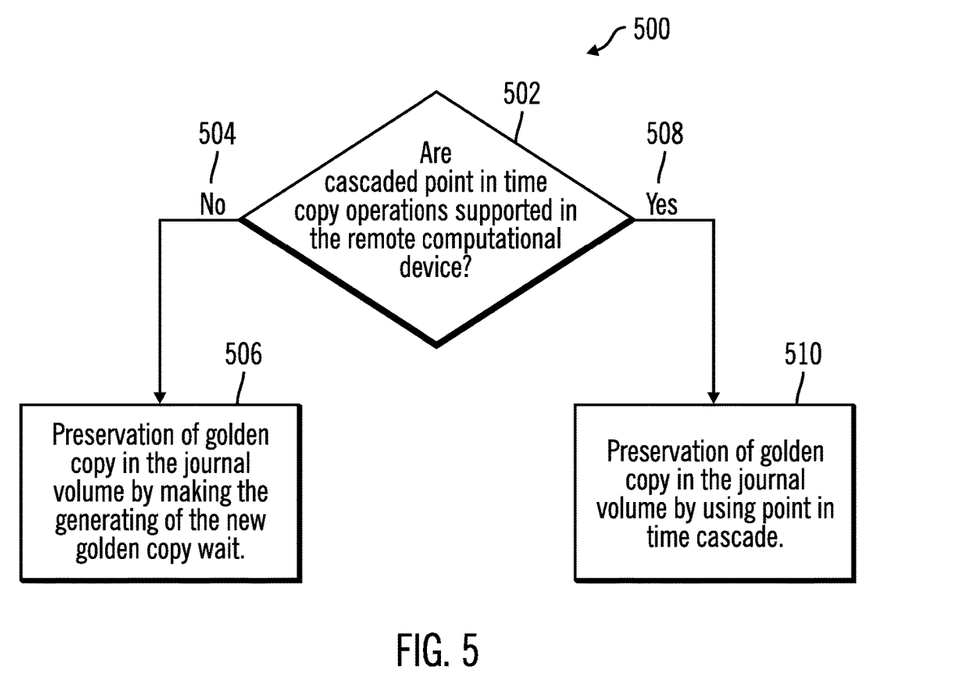
FIG. 5 illustrates a flowchart that shows preservation of golden copy based on whether cascaded point in time copy operations are supported in the remote computational device, in accordance with certain embodiments.

FIG. 5 illustrates a flowchart 500 that shows preservation of golden copy in a journal volume, based whether cascaded point in time copy operations are supported in the remote computational device 106, in accordance with certain embodiments. The operations shown in FIG. 5 may be performed by applications (e.g., the golden copy management application 120) and processes that execute in the remote computational device 106.

Control starts at block 502 in which the golden copy management application 120 determines whether cascaded point in time copy operations are supported in the remote computational device 106. If no ("No" branch 504) control proceeds to block 506 in which preservation of golden copy in the journal volume is performed by making the generating of the new golden copy wait as shown in the operations described in FIG. 2.

If at block 502, the golden copy management application 120 determines that cascaded point in time copy operations are supported in the remote computational device 106 ("Yes" branch 508), then control proceeds to block 510 in which golden copy is preserved in the journal volume by using point in time cascade as shown in the operations described in FIG. 4.

Figure 6:
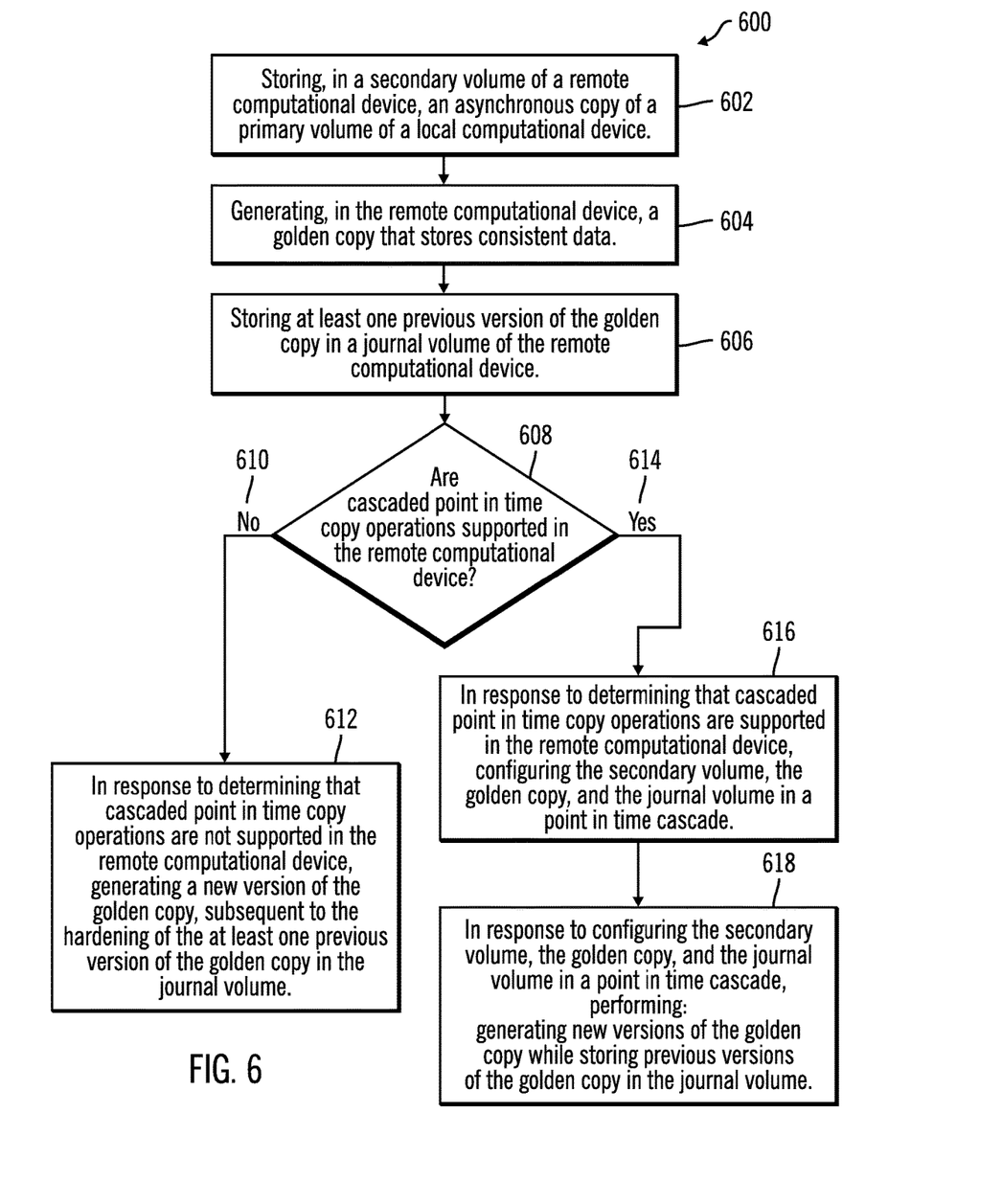
FIG. 6 illustrates a flowchart that shows preservation of golden copy in the remote computational device, in accordance with certain embodiments.

FIG. 6 illustrates a flowchart 600 that shows the preservation of golden copy in a journal volume 116 of the remote computational device, in accordance with certain embodiments. The operations shown in FIG. 6 may be performed by applications (e.g., the golden copy management application 120) and processes that execute in the remote computational device 106.

Control starts at block 602 in which a secondary volume 114 of a remote computational device 106 stores an asynchronous copy of a primary volume 112 of a local computational device 104. The remote computational device 106 generates (at block 604) a golden copy that stores consistent data. At least one previous version of the golden copy is stored (at block 606) in a journal volume 116 of the remote computational device 106.

From block 606 control proceeds to block 608 in which a determination is made as to whether cascaded point in time copy operations are supported in the remote computational device 106.

In response to determining that cascaded point in time copy operations are not supported in the remote computational device 106 ("No" branch 610), control proceeds to block 612 in which a new version of the golden copy is generated, subsequent to the hardening of the at least one previous version of the golden copy in the journal volume 116. It should be noted, that in the embodiments in which cascaded point in time copy operations are not supported, a point in time copy is created from the previous golden copy to the journal volume 116. However, the new version of the golden copy from the secondary volumes 114 cannot be created until the background copy for the new point in time copy from the golden copy volume 118 to the journal volume 116 is complete. In contrast, if cascaded point in time copy operations are supported, certain embodiments may allow creation of the point in time copy from the golden copy volume 118 to the journal volume 116 followed immediately by creation of the point in time copy from the secondary volumes 114 to the golden copy volume 118. The new version of the golden copy includes consistent data at a later point in time in comparison to the previous version of the golden copy that is now stored in the journal volume 116.

In response to determining that cascaded point in time copy operations are supported in the remote computational device 106 ("Yes" branch 614), control proceeds to block 616 in which the secondary volume 114, the golden copy 118, and the journal volume 116 are configured in a point in time cascade. In response to configuring the secondary volume 114, the golden copy 118, and the journal volume 116 in a point in time cascade, the remote computational device 106 generates (at block 618) new versions of the golden copy while storing previous versions of the golden copy in the journal volume 116.

In certain embodiments, the journal volume stores identification of tracks that are not in synchronization and data updates. In further embodiments, the journal volume is used to recovery a last consistency group to the secondary volume during an asynchronous copy recovery process.

Therefore, FIGS. 1-6 illustrate certain embodiments to preserve one or more previous versions of golden copies in a journal volume 116 of a remote computational device 106. The golden copy is stored in a separate set of volumes prior being overwritten with the latest consistency group. The golden copy stored in the separate set of volumes (journal volumes) may be used for testing while the most recent production data is stored in the new golden copy.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
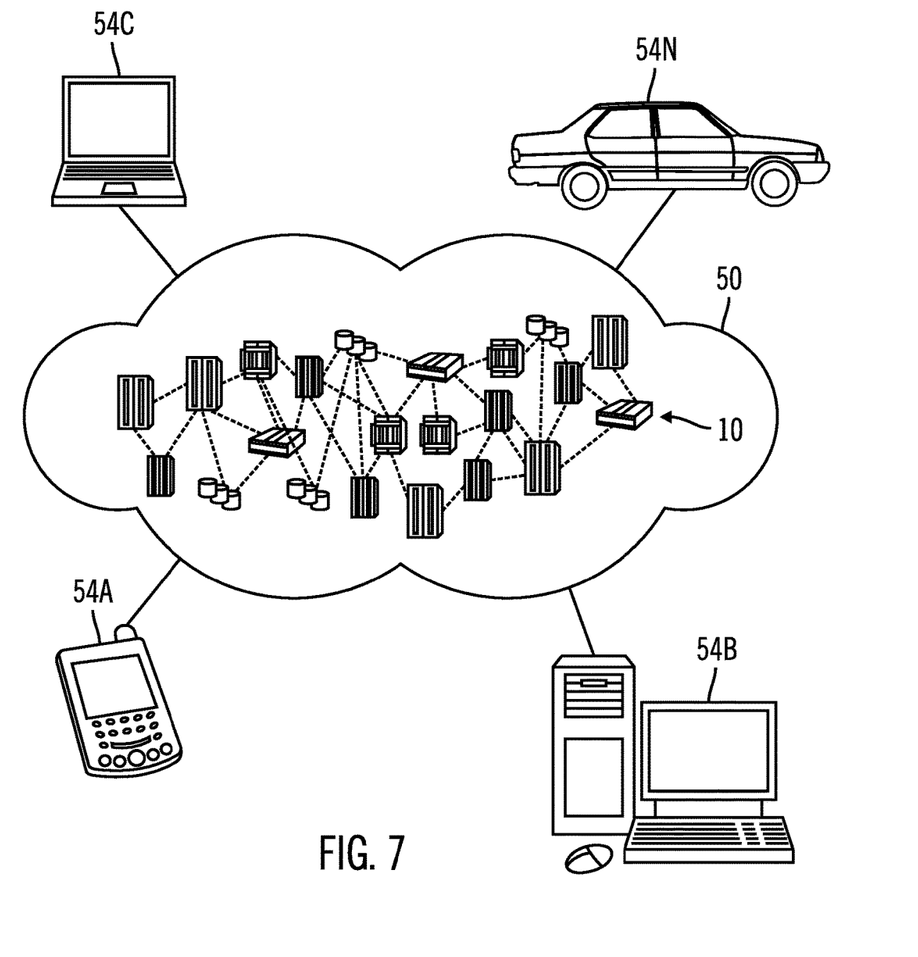
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
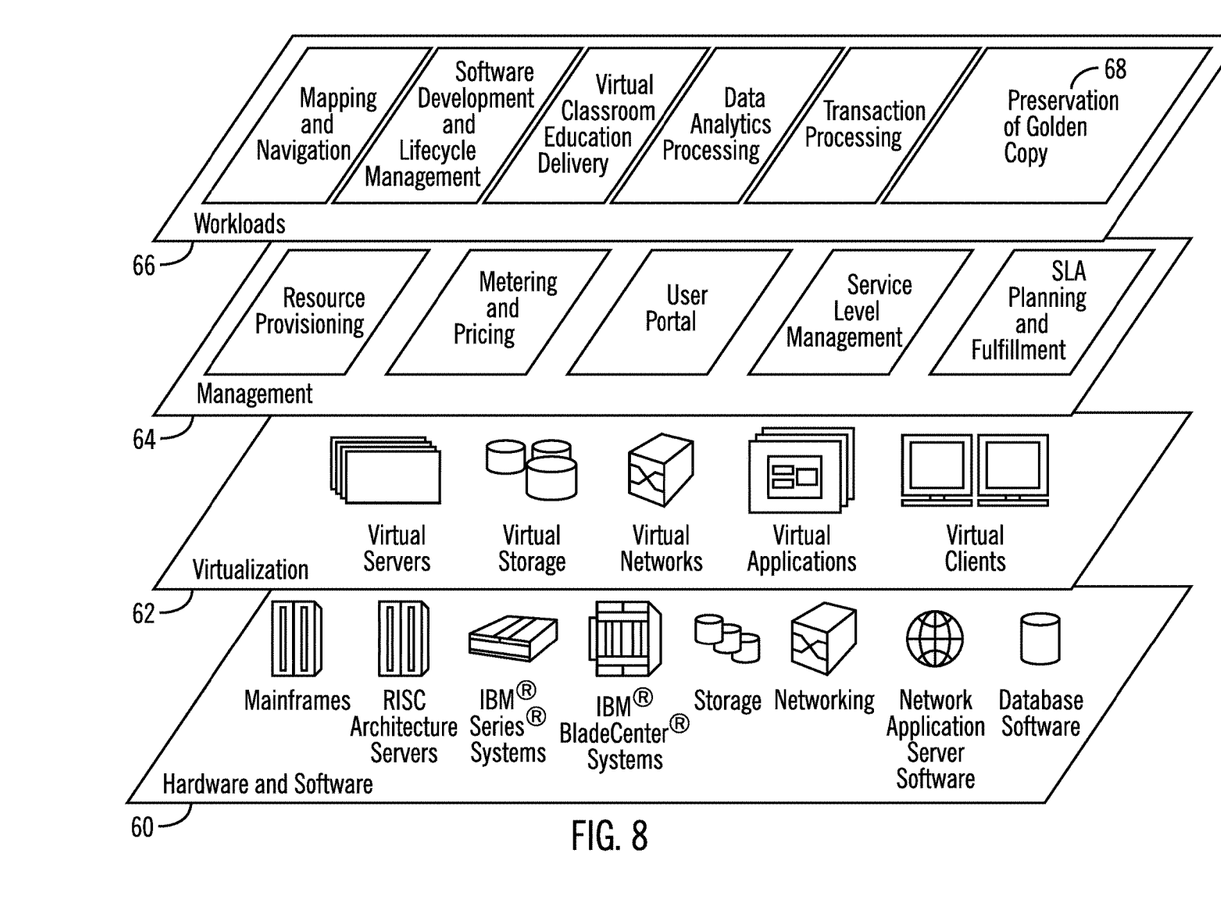
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and preservation of golden copy 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
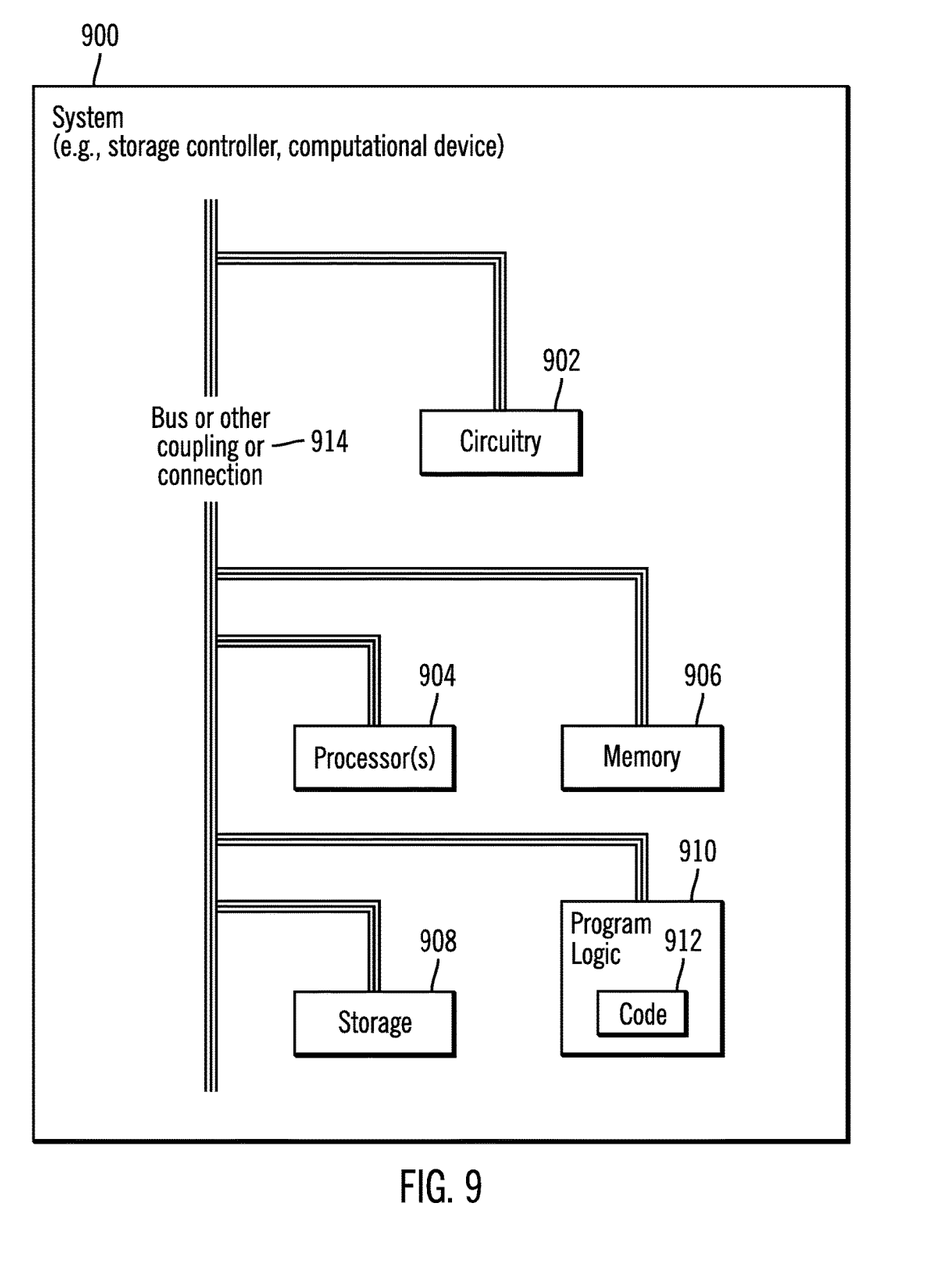
FIG. 9 illustrates a block diagram of a computational system that shows certain elements that may be included in the local and remote computational devices, as described in FIGS. 1-8, in accordance with certain embodiments.

FIG. 9 illustrates a block diagram that shows certain elements that may be included in the local computational device 104, the remote computational device 106, the hosts 102, or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing, in a secondary volume of a remote computational device, an asynchronous copy of a primary volume of a local computational device;
   generating, in the remote computational device, a golden copy that stores consistent data;
   storing at least one previous version of the golden copy in a journal volume of the remote computational device;
   determining whether cascaded point in time copy operations are supported in the remote computational device; and
   in response to determining that cascaded point in time copy operations are not supported in the remote computational device, generating a new version of the golden copy, subsequent to a hardening of the at least one previous version of the golden copy in the journal volume.

2. The method of claim 1, wherein the journal volume stores identification of tracks that are not in synchronization and data updates.

3. The method of claim 2, wherein the journal volume is used to recover a last consistency group to the secondary volume during an asynchronous copy recovery process.

4. A method, comprising:
   storing, in a secondary volume of a remote computational device, an asynchronous copy of a primary volume of a local computational device;
   generating, in the remote computational device, a golden copy that stores consistent data;
   storing at least one previous version of the golden copy in a journal volume of the remote computational device;

determining whether cascaded point in time copy operations are supported in the remote computational device; and in response to determining that cascaded point in time copy operations are supported in the remote computational device, configuring the secondary volume, the golden copy, and the journal volume in a point in time cascade.

5. The method of claim 4, the method further comprising:

in response to configuring the secondary volume, the golden copy, and the journal volume in a point in time cascade, performing:

generating new versions of the golden copy while storing previous versions of the golden copy in the journal volume.

6. A system, comprising:

a memory; and one or more processors coupled to the memory, wherein the one or more processors perform operations, the operations comprising:

storing, in a secondary volume of a remote computational device, an asynchronous copy of a primary volume of a local computational device;

generating, in the remote computational device, a golden copy that stores consistent data;

storing at least one previous version of the golden copy in a journal volume of the remote computational device;

determining whether cascaded point in time copy operations are supported in the remote computational device; and in response to determining that cascaded point in time copy operations are not supported in the remote computational device, generating a new version of the golden copy, subsequent to a hardening of the at least one previous version of the golden copy in the journal volume.

7. The system of claim 6, wherein the journal volume stores identification of tracks that are not in synchronization and data updates.

8. The system of claim 7, wherein the journal volume is used to recover a last consistency group to the secondary volume during an asynchronous copy recovery process.

9. A system, comprising:

a memory; and one or more processors coupled to the memory, wherein the one or more processors perform operations, the operations comprising:

storing, in a secondary volume of a remote computational device, an asynchronous copy of a primary volume of a local computational device;

generating, in the remote computational device, a golden copy that stores consistent data;

storing at least one previous version of the golden copy in a journal volume of the remote computational device;

determining whether cascaded point in time copy operations are supported in the remote computational device; and in response to determining that cascaded point in time copy operations are supported in the remote computational device, configuring the secondary volume, the golden copy, and the journal volume in a point in time cascade.

10. The system of claim 9, the operations further comprising:

in response to configuring the secondary volume, the golden copy, and the journal volume in a point in time cascade, performing:

generating new versions of the golden copy while storing previous versions of the golden copy in the journal volume.

11. A computer program product, the computer program product comprising a computer readable storage medium having computer readable program code embodied therewith, the computer readable program code configured to perform operations, the operations comprising:

storing, in a secondary volume of a remote computational device, an asynchronous copy of a primary volume of a local computational device;

generating, in the remote computational device, a golden copy that stores consistent data;

storing at least one previous version of the golden copy in a journal volume of the remote computational device;

determining whether cascaded point in time copy operations are supported in the remote computational device; and in response to determining that cascaded point in time copy operations are not supported in the remote computational device, generating a new version of the golden copy, subsequent to a hardening of the at least one previous version of the golden copy in the journal volume.

12. The computer program product of claim 11, wherein the journal volume stores identification of tracks that are not in synchronization and data updates, and wherein the journal volume is used to recover a last consistency group to the secondary volume during an asynchronous copy recovery process.

13. The computer program product of claim 12, wherein the journal volume is used to recover a last consistency group to the secondary volume during an asynchronous copy recovery process.

14. A computer program product, the computer program product comprising a computer readable storage medium having computer readable program code embodied therewith, the computer readable program code configured to perform operations, the operations comprising:

storing, in a secondary volume of a remote computational device, an asynchronous copy of a primary volume of a local computational device;

generating, in the remote computational device, a golden copy that stores consistent data;

storing at least one previous version of the golden copy in a journal volume of the remote computational device;

determining whether cascaded point in time copy operations are supported in the remote computational device; and in response to determining that cascaded point in time copy operations are supported in the remote computational device, configuring the secondary volume, the golden copy, and the journal volume in a point in time cascade.

15. The computer program product of claim 14, the operations further comprising:

in response to configuring the secondary volume, the golden copy, and the journal volume in a point in time cascade, performing:

generating new versions of the golden copy while storing previous versions of the golden copy in the journal volume.

* * * * *